June 8, 1965 K. D. DOWNING 3,187,936
INTEGRAL FUEL FILLER PIPE AND VENT TUBE
Filed Nov. 1, 1962
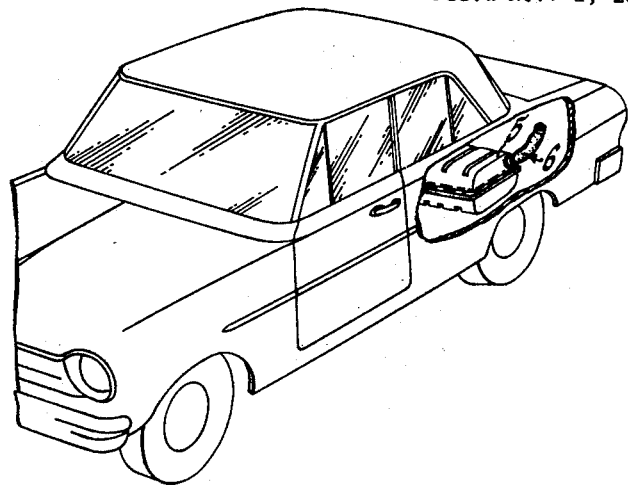
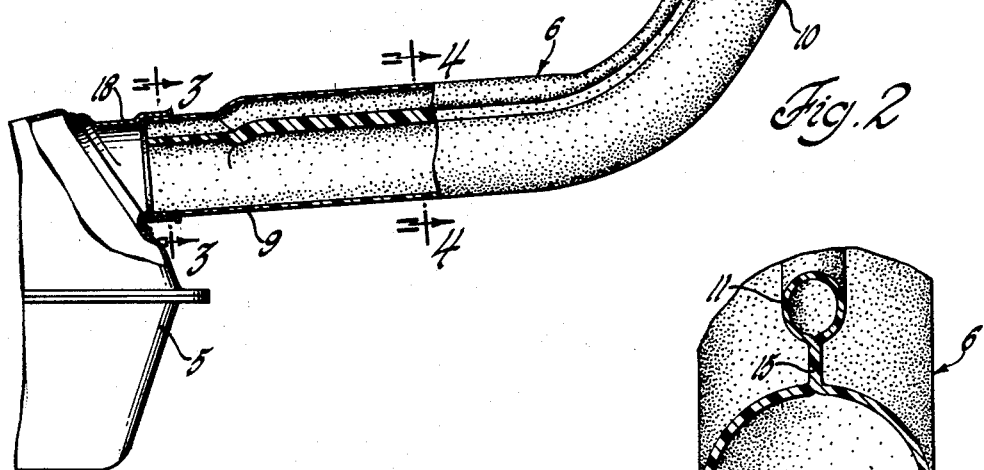
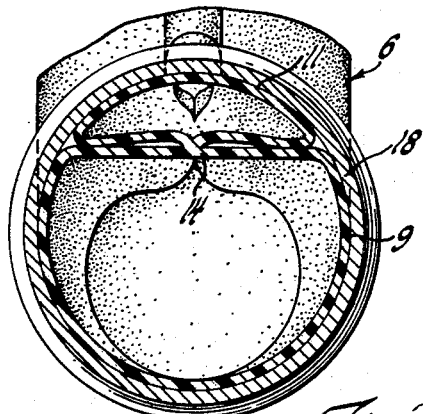
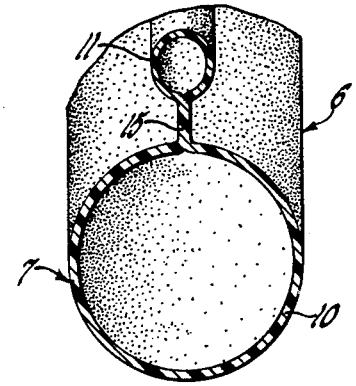
INVENTOR.
Kenneth D. Downing
BY
Paul J. Ethington
ATTORNEY

3,187,936
INTEGRAL FUEL FILLER PIPE AND VENT TUBE
Kenneth D. Downing, Warren, Mich., assignor to General Motors Corporation, Detroit, Mich., a corporation of Delaware
Filed Nov. 1, 1962, Ser. No. 234,761
4 Claims. (Cl. 220—86)

The present invention relates to automobile filler pipes which serve as a means for transferring fuel from a source, such as a fuel pump, to the fuel tank. More particularly, the invention relates to a molded thermoplastic fuel filler pipe having an integral vent tube.

A difficulty encountered in the prior art automobile filler pipes is gasoline "spit back" which occurs when air or fuel vapors become trapped in the fuel tank. To overcome this difficulty, a vent tube has been used in combination with the filler pipe for venting the vapors to the atmosphere. In order to perform its function with greatest efficiency, the vent tube must be located so as not to interfere with the flow of fuel and yet must communicate with the fuel tank in order to vent the fuel vapors to the atmosphere.

Pritor art devices using a separate vent tube have experienced a measure of success in reducing gasoline "spit back" but these devices have not proved entirely satisfactory, especially from a cost standpoint, since a variety of rolling, bending, and welding operations where required to form and assemble the component parts. In addition, prior art devices constructed of metal necessitated a hose or similar device for connecting the filler pipe to the fuel tank in order to insure proper sealing qualities.

The present invention overcomes the disadvantages associated with the prior art devices by constructing a filler pipe have a vent tube which extends externally of the filler pipe so as not to interfere with the normal flow of fuel and yet is formed integrally with the filler pipe, thus eliminating any steps necessary in assembling independent elements.

In constructing the present invention, a thermoplastic material is used which may be easily formed in the desired shape by a blow molding process.

Other advantages of the present invention will become apparent from the disclosure made in the following detailed description of a preferred embodiment of the invention taken in conjunction with the accompanying drawings wherein like reference characters designate like parts and wherein FIGURE 1 is a general view showing an automobile in outline with the filler pipe leading to the fuel tank;

FIGURE 2 is an elevational view of the integral filler pipe and vent tube shown partly in section;

FIGURE 3 is a sectional view taken on lines 3—3 of FIGURE 2; and

FIGURE 4 is a sectional view taken on lines 4—4 of FIGURE 2.

Referring now to the drawings, FIGURE 1 shows a general outline of an automobile having a fuel tank 5, with an integral fuel filler pipe and vent tube generally designated 6 attached thereto. The construction of the present invention may be more closely examined in FIGURE 2 and comprises a first conduit or filler pipe 7 having an upper portion 8 of circular cross-section and of predetermined diameter, an intermediate portion 10 of circular cross-section and reduced diameter and a lower portion 9 of D-shaped configuration. A second conduit or vent tube 11 is formed integrally with an extends externally of the intermediate and lower portions of the filler pipe 7 and communicates therewith at the juncture 20 of the intermediate portion with the upper portion. The lower end of the vent tube 11 is of D-shaped configuration and in conjunction with the lower portion of the filler pipe forms a cylinder of circular cross-section divided by a wall 14.

As stated above, the integral filler pipe and vent tube is formed of a thermoplastic material such as high density polyethylene or nylon. The desired shape may be easily obtained through a typical blow molding process in which an extruded tube of uniform thickness is dropped from the head of a thermoplastic extruder into an approximately shaped cavity between two molds. After the mold is closed, compressed air is applied to force the extrudate against the sides of the mold. During the blow molding process, a webbed portion 15 is formed between the filler pipe 7 and vent tube 11.

During the blow molding process, the upper end structure is made to terminate in a re-entrant portion 16 which has notches 17 formed therein for receiving a bayonet type cap. Since the plastic is relatively soft and pliable, it can be attached directly to the short neck 18 of the fuel tank 5 and still provide good sealing qualities.

It is apparent from the above disclosure that fuel enters the filler pipe 7 at the upper portion and flows unhampered by any obstruction to the fuel tank and that vapors trapped in the fuel tank may conveniently escape to the atmosphere through the vent tube 11.

The embodiment of the invention disclosed therein is for illustrative purposes only and the scope of the invention is intended to be limited only by the following claims.

I claim:

1. An automobile fuel filler pipe and vent tube arrangement constructed of a resilient thermoplastic material and comprising a first conduit having an upper portion for receiving a fuel hose nozzle and a lower portion for communicating with a fuel tank, a second conduit formed integrally with and extending externally of said first conduit and defining openings at the upper and lower ends thereof, said upper end communicating with said first conduit at a point spaced from the end of said upper portion, said lower end communicating directly with said fuel tank.

2. An automobile fuel filler pipe and vent tube arrangement constructed of a resilient thermoplastic material and comprising a first conduit having an upper portion of circular cross-section and predetermined diameter for receiving a fuel hose nozzle, an intermediate portion of circular cross-section and reduced diameter, a lower portion of predetermined diameter and circular cross-section for connecting to a fuel tank, a second conduit formed integrally with and extending externally of said intermediate and lower portions, said second conduit defining openings at the upper and lower ends thereof, said upper end communicating with said first conduit at the juncture of said intermediate portion and said upper portion, said lower end communicating with said fuel tank.

3. An automobile fuel filler pipe and vent tube arrangement constructed of a resilient thermoplastic material and comprising a first conduit having an upper portion of circular cross-section and predetermined diameter, an intermediate portion of circular cross-section and reduced diameter, and a lower portion of D-shaped configuration, a second conduit formed integrally with and extending externally of said intermediate and said lower portions and defining openings at the upper and lower ends thereof, said upper end communicating with said first conduit at the juncture of said upper and intermediate portions, said lower end having a D-shaped configuration and forming in conjunction with said lower portion a cylinder of circular cross-section divided by a wall, said wall extending as a chord of the circular cross-section, said lower end and said lower portion communicating directly with the fuel tank of said automobile.

4. An automobile fuel filler pipe construced of a resilient thermoplastic material and comprising an upper portion of circular cross-section and predetermined diameter having an end structure terminating in a re-entrant portion containing notches adapted to receive a bayonet type cap, a lower portion of D-shaped configuration and an intermediate portion of circular cross-section and reduced diameter, a vent tube constructed of a resilient thermoplastic material and formed integrally with and extending externally of said intermediate and said lower portions defining a web structure therebetween, said vent tube having a smaller diameter than said intermediate portion and defining openings at the upper and lower ends thereof, said upper end communicating with said filler pipe and the juncture of said intermediate portion and said upper portion, said lower end having a D-shaped configuration and forming in conjunction with said lower portion a cylinder of circular cross-section divided by a wall, said wall extending as a chord of the circular cross-section, said lower end and said lower portion communicating directly with the fuel tank of said automobile.

References Cited by the Examiner

UNITED STATES PATENTS

| 701,075 | 5/02 | McCully | 138—111 |
| 2,138,104 | 11/38 | Kellogg | 220—86 |
| 2,508,124 | 5/50 | Stephenson | 220—86 |

FOREIGN PATENTS 505,384  5/39  Great Britain.

EDWARD V. BENHAM, *Primary Examiner.*

LEWIS J. LENNY, *Examiner.*